Sept. 27, 1966      J. L. QUINN ETAL      3,275,806
BUSINESS RECORD BEARING CODED INDICIA
Original Filed Oct. 20, 1958      3 Sheets-Sheet 1
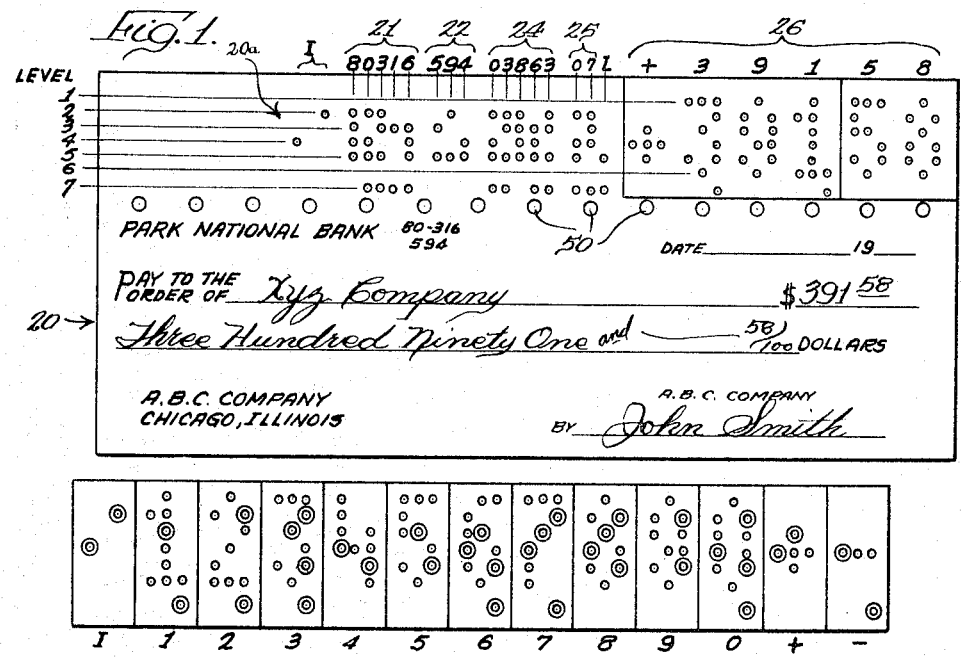
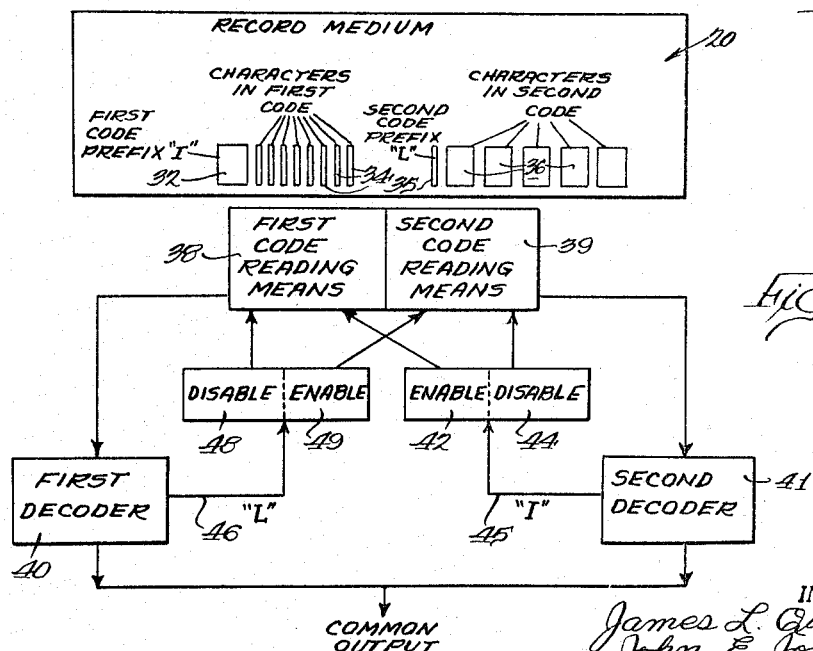
INVENTORS
James L. Quinn
John E. Jones
By Wolfe, Hubbard, Voit & Osann,
Attys Sept. 27, 1966  J. L. QUINN ETAL  3,275,806
BUSINESS RECORD BEARING CODED INDICIA
Original Filed Oct. 20, 1958  3 Sheets-Sheet 2
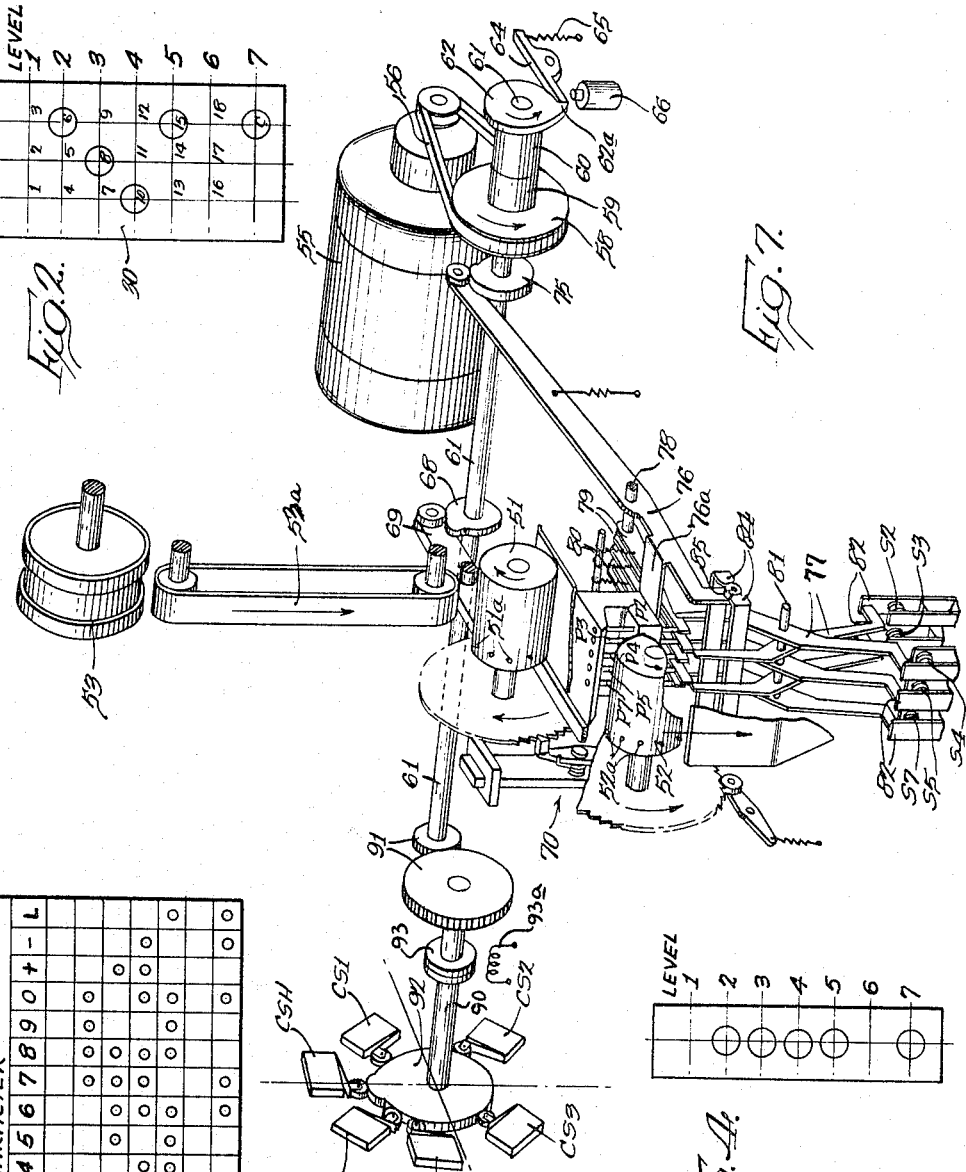
INVENTORS.
James L. Quinn
John E. Jones
By Wolfe, Hubbard, Voit & Osann.
Attys.

Sept. 27, 1966 J. L. QUINN ETAL 3,275,806
BUSINESS RECORD BEARING CODED INDICIA
Original Filed Oct. 20, 1958 3 Sheets-Sheet 3
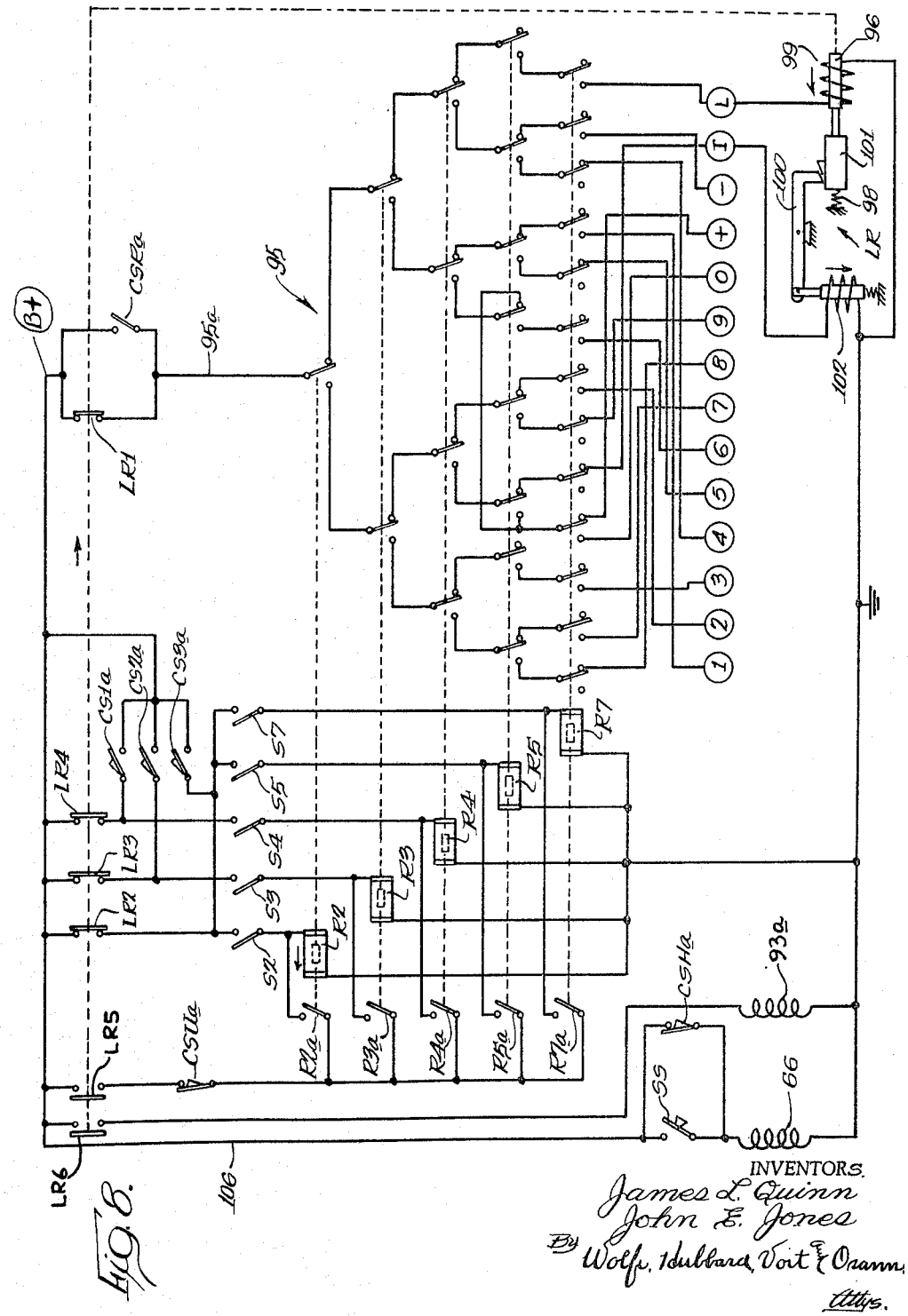
INVENTORS.
James L. Quinn
John E. Jones
By Wolfe, Hubbard, Voit & Osann
Attys.

United States Patent Office 3,275,806
Patented Sept. 27, 1966

3,275,806
BUSINESS RECORD BEARING CODED INDICIA
James L. Quinn, Chicago, and John E. Jones, Wilmette, Ill., assignors to Cummins-Chicago Corp., Chicago, Ill., a corporation of Illinois
Original application Oct. 20, 1958, Ser. No. 768,436, now Patent No. 3,033,449, dated May 8, 1962. Divided and this application Mar. 2, 1962, Ser. No. 176,953
4 Claims. (Cl. 235—61.12)

The present application is a divisional application based upon the copening application of James E. Quinn and John E. Jones, Serial No. 768,436, filed October 20, 1958, now Patent No. 3,033,449, and which is assigned to the assignee of the present application.

This invention relates in general to data processing and, more particularly, to business documents or other record media having character-representative infomation formed thereon by the application of coded indicia in diverse codes.

In the modernization of business practices, the arithmetical operations formerly performed by clerks mentally or with calculators are now being accomplished by automatic "data processors." This trend has been described as "office automation." It is useful in almost any type of commercial establishment. For example, in banks a great number of clecks, deposit slips, payment coupons, and the like must be sorted or posted, and the numerical values associated with each arithmetically handled in addition or subtraction operations.

Each business transaction is represented by some record or document, such as a check. Before the information, numerical or otherwise, on that record can be processed by automatic devices, it must be translated into the "language" of the devices. Most commonly, the "language" employed is in the form of electrical signals of the type acceptable as inputs to well-known electrical computers.

In some instances, characters conventionally printed on checks or other documents are transcribed into a code language by clerks operating keyboard machines which produce uniformly coded characters on a special paper or magnetic tape. The paper or magnetic tape can then be passed through a "reader" which produces the desired electrical output signals in the language of the data processor or other business machine.

In other instances, the check or business document is originally formed as a "business machine card" with punched holes or other indicia thereon which represent by a single, predetermined code the significant characters of the document. These "business machine cards" can be fed directly through a "reader" which senses the coded indicia and creates the electrical signals to be utilized by the sorters, tabulators, calculators, or other automatic business machines.

The coded indicia applied to business documents or records has heretofore been illegible, and, moreover, space-consuming. Proposals have been made for representing certain characters on business documents in a legible type code which can be read not only by a visual inspection but also by special reading machines. These have been burdened by the drawbacks of consuming an undue amount of available space on each document, and of requiring elaborate apparatus and procedures for applying legible code characters in the first instance as well as for automatically reading such code characters by special apparatus.

It is a general aim of the present invention to provide a business document or other record medium bearing character-representative information formed thereon by the application of coded indicia in diverse codes which occupy a relatively small portion of the total area of such a medium and characterized by the fact that the most significant characters are visually legible.

Another object of the invention is to provide a record medium in which character-representative information is applied to the medium in the form of indicia spots in both an in-line code and a plural-line code, yet wherein any given character is uniquely represented by a particular combination of spots selectively located at different levels irrespective of whether that character is represented in the in-line or the plural-line code, thus facilitating the processing of the coded information by automatic processing equipment.

It is a more specific object of the invention to provide a business document or other record medium bearing character-representative information formed by the application of indicia spots in both a legible code and an illegible code which are positioned on the medium so as to permit successive reading of the two codes and wherein prefix characters are applied to the medium to identify the succeeding codes. The provision of such prefix characters on the record medium makes it possible to process the information with automatic processing equipment which would otherwise be unable to distinguish between the two codes.

Other objects and advantages of the invention will become apparent as the following description proceeds, taken in conjunction with the accompanying drawings, in which:

FIGURE 1 is an illustration of a typical business document embodying the features of the present invention and having characters represented by indicia thereon in two different codes;

FIG. 2 illustrates the significant locations of indicia stations in the field of a plural-line, legible character code;

FIG. 3 shows the representation of thirteen exemplary characters in the plural-line legible code;

FIG. 4 illustrates the significant locations of indicia stations within a field for one character of a single-line or in-line illegible code;

FIG. 5 is a chart illustrating the combinations of significant locations employed to represent thirteen exemplary characters according to the in-line code;

FIG. 6 is a diagrammatic block-and-line representation of a system for reading record media embodying the features of the present invention;

FIG. 7 is a diagrammatic perspective view of an exemplary "feeler" type dual code reader which can be used to process a record medium bearing information in dual codes; and, FIG. 8 is a schematic wiring diagram of electrical components associated with the exemplary reader shown in FIG. 7.

While the invention is susceptible of various modifications and alternative constructions, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternative constructions falling within the spirit and scope of the invention as expressed in the appended claims.

TYPICAL BUSINESS DOCUMENT AND TWO CODE SYSTEMS

Referring now to FIG. 1, a record medium or business document in the form of a commercial check 20 is there shown. Insofar as the printed and written contents of the check are concerned, it is in every way conventional. When such a check is deposited by the payee, it is then the subject of several successive bookkeeping and sorting operations. The bank which receives the check from the payee for deposit must credit the latter's account in the correct amount ($391.58) and debit the same amount in its account with the Federal Reserve system or clearing house. The check is forwarded to the Federal Reserve Bank or clearing house, where the amount must be credited to the forwarding bank and debited to the account of the drawee bank. The check must be sorted and forwarded to the drawee bank.

The drawee bank must process the check by debiting the account of the drawer, crediting the account of the Federal Reserve Bank or clearing house, and by sorting the check into a group drawn by the same drawer for return to the latter.

All of these transactions involve routine manipulations of numerical data which are preferably carried out by automatic data processing apparatus. To be susceptible of direct reading into data processing apparatus, a great deal of numerical information must be represented by indicia which can be mechanically or electrically sensed.

In accordance with one of the important aspects of the present invention, a record medium is provided having character-representative information applied thereto in accordance with two different binary code systems, one code being an in-line code which represents characters in visibly illegible form, and the second code being a plural-line matrix code which represents characters in visibly legible form. In the exemplary form of the invention, the in-line, or visibly illegible, code consists of a pattern of indicia spots which are located at different combinations of selected levels within a single line to uniquely represent particular characters, each combination representing a different character. The plural-line, or visibly legible, code comprises a pattern of indicia spots which are located in different combinations of selected levels in a matrix formed by adjacent lines of indicia spots, the entire pattern of spots in each matrix representing a character which is conventional in configuration and which permits of instantaneous reading by untrained personnel.

As the ensuing description proceeds, it will be apparent that the term "visibly illegible" is intended to connote a pattern of indicia spots which represent character information according to a code not readily readable by untrained personnel, while the term "visibly legible" is intended to connote a pattern of indicia spots which is readily readable by untrained personnel. That is, the characters in the latter code may, merely by way of example, be present in the form of Roman or Arabic numerals. And, it is in this context that these terms are used in the appended claims.

In the present example, the upper portion 20a of the check contains indicia in the form of selectively located perforations which, according to two different codes, represent numerical characters to be read mechanically or electrically. The first number so represented is the Federal Reserve routing number having five digits corresponding to a group of five code lines 21, each containing perforations in a unique combination of vertical stations. The second such number identifies the drawee bank and has three digits represented by a group 22 of three vertically spaced perforation code lines. The third such number is the account number which identifies the drawer in the bookkeeping system maintained by the drawee bank. This number is represented by a group of five perforation code lines 24. The fourth number signifies the transaction code, that is, indicates that the transaction is a check in which the amount involved is to be debited to the drawer's account. This is represented by a group of two vertical code lines 25. All of the code lines in the groups 21–25 are arranged vertically and shown here as being serially spaced from left to right along the upper edge of the check 20. It is to be understood, however, that the particular arrangement of indicia for the different numbers can vary considerably.

The numbers represented by the code line groups 21–25 are termed "prequalifying" information. Those numbers will be the same for all checks written by a given drawee. Thus, if perforations are employed to represent these prequalifying numbers according to a given code, it is possible for a complete stack or book of checks to be prequalified simply by one operation of a conventional perforating machine which is set up to perforate the several holes at the proper locations. However, other indicia besides perforations can be employed. For example, instead of perforated holes, small black dots of ink could be employed and which would be susceptible of photoelectric sensing by virtue of the fact that they are less reflective to light than the surrounding, uninked portions of the check paper. While indicia in the form of perforations are preferred, it is to be understood that other indicia, such as ink spots, may be used in lieu thereof.

At any given station within a code field or line, a perforation is either present or absent. Thus, the coding arrangement here used is "binary" in form in the sense that any given station can have one of two states, i.e., perforated or unperforated.

The amount of the check 20 is represented by perforations applied in a second code at 26, and here shown as a pattern of perforations which makes each numerical character visibly legible. This is important because it serves as protection against the amount of the check being altered after once written, and permits the amount to be visually verified at each step in the processing operations. These visible perforations may be applied with a check writer machine by the drawer or they may be subsequently applied by the depositor's bank, Federal Reserve Bank, or the drawee bank prior to the check being put through automatic reading apparatus.

It will be observed that the numbers represented by the coded perforation lines at 21–25 have each digit represented by a single line of perforations. This is herein termed an "in-line" code, and such an arrangement permits a large quantity of numerical digits or characters to be represented in a relatively small space. On the other hand, the numerical digits represented in the area 26 are legible in form, due to the pattern of perforations employed. Each digit in this case is represented by perforations which appear at selected stations within a rectangular field, and specifically a field which has three vertical lines therein and six horizontal levels. Such a coding arrangement is herein termed a "plural-line" code where the number of lines $n$ occupied by the field for one character is in this instance equal to three.

Referring to FIG. 2, a field 30 for one legible perforated character is there shown, comprising a rectangular matrix having perforation stations 1–18 formed by the intersections of three imaginary vertical lines and six imaginary horizontal lines. By selectively locating perforations at different combinations of these eighteen stations, any numerical or alphabetical character can be visibly represented. FIG. 3 shows the perforation patterns for the characters 0–9, I, + and −. In punching selected combinations of perforations at different ones of the eighteen stations to represent different characters, an additional perforation location is employed which may or may not be perforated according to the particular character to be represented. This perforation location is utilized for purposes of parity checking in reading apparatus, and is designated in FIG. 2 by the letter "c." It will be seen that the perforation of the checking location c is in the third vertical line of the matrix, i.e., on the right, and is located below the sixth level. Thus, the stations which may or may not receive perforations in the representation of any character are located in three vertical lines and at seven different levels (FIG. 2).

In keeping with the present invention, certain only of the total number of the spots of indicia representative of any given legible character are significant for purposes of "reading" by automatic processing equipment. That is, while the human eye requires a substantially complete field of spots to readily decipher the information, automatic processing equipment need only look at certain "significant locations" in the field in order to decipher the information. FIG. 2, by the five small circles drawn therein, shows those particular stations which are "significant locations" in the perforation field and which will be perforated in a unique combination for each of the several characters to be represented. These significant locations are stations 6, 8, 10, 15 and c. Each of the $m$ (here $m=5$) significant locations is at a different level, i.e., the five significant locations are at levels 2, 3, 4, 5 and 7. There is one significant perforation location in the first and second vertical lines of the matrix field, and three such significant locations in the third line. When the numerical character "1" is perforated in a field, then perforations will be present at significant locations 8 and c (FIG. 3). In like manner, if the numerical characters "2" or "3" are perforated in a field, then perforations will appear in significant locations 6, c or 6, 8, 15, c, respectively. Inspection of FIG. 3 will reveal that each of the several characters to be represented in plural-line perforation fields will contain perforations in a unique combination of the five significant locations.

In addition to the numerical digits 0 through 9, it is contemplated in the present instance, that three other characters may be represented in plural-line perforation fields. A plus sign may be so represented, and will have perforations appearing at significant locations 8 and 10 (FIG. 3). A minus sign may also be represented, having a perforation in only one significant location, i.e., location 10. Finally, a code-identifying prefix character "I" may also be represented by perforations appearing at stations 6 and 10 both of which are significant locations. The purpose of the prefix character "I" is to signify that following characters represènted on a record medium or business document will be in an illegible code.

As previously indicated, certain numerical characters on the check 20 are represented by illegible, in-line coded perforations. FIGS. 4 and 5 illustrate the in-line code which is employed in the present instance. As shown in FIG. 4, each in-line perforation field consists of a single vertical row of perforation stations which preferably are located at levels 2, 3, 4, 5 and 7. Each of these perforation stations is a significant location, i.e., the presence or absence of perforations in different combinations of the $m$ levels (here $m=5$) of a single line can, according to a predetermined code, represent any one of a number of different characters. As shown in FIG. 5, the numerical character "1" is represented by perforations at levels 3 and 7 in a given line. The numerical characters "2" or "3" are represented by perforations at levels 2, 7 and 2, 3, 5, 7, respectively. The other combinations of perforation locations to represent different numerical characters will be evident from FIG. 5. Plus or minus symbols may be represented by perforations in the locations shown. Fnally, a code-identifying prefix character "L" may be represented by perforations at levels 5 and 7 within one line. This prefix character is applied to a record medium just before characters which are represented thereon in a plural-line legible code; in other words, the character "L" signifies that characters following that prefix on a document are coded in a plural-line code.

In keeping with a preferred embodiment of the invention, the $m$ levels of significant locations in legible code matrices correspond to the $m$ levels of significant locations within a single-line code field. In other words, each of the significant locations in a plural-line legible code field appears at one of five different levels 2, 3, 4, 5, and 7 (FIG. 2), while each of the significant locations for an in-line code field appears at one of the same five levels (FIG. 4). Referring to FIGS. 3 and 5 conjointly, it will be noted that any given character is represented by perforations at significant locations in the same levels irrespective of which code is employed. For example a "2" is represented by perforations at significant locations in levels 2 and 7 in both codes. Similarly, a "7" is represented by perforations at significant locations in levels 2, 3, 4 and 7 in both codes.

While the particular plural-line code system and the particular in-line code system described above are preferred, it will be understood that a number of different arbitrary codes may be selected and utilized without departing from the spirit and concept of the present invention. Although the significant locations of perforations for both code systems at $n$ levels, which here number five, this is not a vital requirement in the advantageous practice of the invention.

With an understanding of the in-line and plural-line codes employed to represent the characters on the check 20 (FIG. 1), it will be apparent that the area 20a carries indicia in the form of selectively located perforations which, reading from left to right, represent all of the significant numerical characters mentioned above. The first character is a prefix character "I," designating that the characters following to the right are coded in the illegible, in-line code. The succeeding group of five in-line code characters represent, according to the code system of FIG. 5, the Federal Reserve routing number 80316. The next group of three characters 22 represents the bank-identifying number of 594, while the following group 24 of six illegible code lines represents the drawer's account number 03863. The succeeding two lines represent a transaction code 07, which may mean that the face value of the check is to be subtracted from the balance in the drawer's account at the drawee bank.

At the end of the in-line code characters and preceding characters at 26 which are represented by a plural-line, legible code, the plural-line prefix character "L" appears (FIG. 1). This prefix character "L" signifies that the coded information which follows in the area 26 is in the plural-line code. This final group of characters represents the amount of the check +391.58.

GENERAL ORGANIZATION OF AN EXEMPLARY READING APPARATUS

In order to mechanically or electrically read the numerical information so represented on documents such as the check 20 (FIG. 1), a dual code reader is provided which is organized in the general fashion illustrated by the block-and-line diagram of FIG. 6. As there shown, the record medium or check 20 carries indicia which represent different numerical characters in two different codes in accordance with the invention. The first character appearing on the check 20 is prefix character 32 which signifies that the following group of characters 34 are represented in an in-line code system. Following the group 34, a second prefix character 35 appears which signifies that the succeeding group of characters 36 are represented in a plural-line, legible code.

To automatically "read" these numerical characters, first and second code reading means 38, 39 are employed in combination with some transport (not shown in FIG. 6) which moves the coded indicia on the record medium 20 successively past such reading means. The first reading means 38 is adapted to sense one line of indicia at a time and to respond uniquely to the indicia according to the in-line code. In other words, the means 38 will respond uniquely to perforations located in different combinations of significant locations of in-line code fields, such as the characters 34, 35. This first reading means 38 supplies its output signals to a first decoder 40, which converts the unique response into a particular output signal for any of the several possible characters which are representable in the in-line code system.

The second code reading means 39 is adapted to sense a plurality of lines of indicia at a time and to respond uniquely to indicia present in different combinations of significant locations within a plural-line code field, such as characters 32, 36. It supplies its output signals to a second decoder 41 which leads to an output common with the decoder 40, and supplies the same signal to that common output for a character represented in a plural-line code as is supplied by the first decoder 40 for a corresponding character represented in the in-line code.

The first and second code reading means 38 and 39 are susceptible of being made selectively operable or inoperable. They are complementarily made operative so that when one is effective to read characters in the first code, the other does not respond at all. To make certain that the first code reading means 38 is enabled or active when characters in the first, in-line code are passing thereby, an enabling device 42 is associated with the first reading means 38 and a disabling device 44 connected to control the second reading means 39. The enable-disable devices 42, 44 receive a signal from the second decoder 41 whenever the second code reading means 39 senses a prefix character "I" which signifies that the following characters on the record medium are in the illegible code. Thus, when the indicia 32 on the record medium 20 is sensed by the second reading means 39, an output signal on a line 45 leading from the decoder 41 actuates the enabling and disabling devices 42 and 44, thereby rendering the first code reading means 38 operative and the second code reading means 39 inoperative. With this, only the first code reading means 38 responds to the group of characters 34 represented in the illegible, in-line code. The decoder 40 provides appropriate output signals to the common output which correspond to the numerical characters represented by the group 34.

When the check 20 has moved sufficiently such that the prefix character 35 or "L" is sensed by the first reading means 38, the first decoder 40 supplies an output signal on a line 46 leading to a disabling device 48 and an enabling device 49 which are respectively connected to control the first and second reading means 38 and 39. Thus, whenever the prefix character "L" is read by the reading means 38, the disabling device 48 will render the reading means 38 thereafter inoperative, while the enabling device 49 will render the second reading means 39 operative. Thus, as the plural-line code group 36 passes by the second code reading means 39, the latter will be effective to make the second decoder 41 supply appropriate response signals to the common output.

While the first and second reading means 38, 39 in FIG. 6 have been shown spaced apart and separate, they are actually substantially alined relative to the record medium or check 20, so that there is no problem of timing or time delays.

Also, the first and second reading means 38 and 39 may contain components which are common to both. Likewise, the first and second decoders 40, 41 may be combined into a single decoder which responds to the outputs of either the first or second reading means. This will be clarified by reference to FIGS. 7 and 8 which illustrate in detail a mechanical form of the dual code reading system diagrammatically shown in FIG. 6. Those interested in other forms of reading systems that might be employed are referred to the aforesaid copending application of James L. Quinn and John E. Jones, Serial No. 768,436, now Patent Number 3,033,449.

EXEMPLARY READING APPARATUS

Referring now to FIG. 7, a mechanical "feeler" type dual code reader is there shown which comprises means for feeding documents embodying the features of the present invention such as the check 20 (FIG. 1), successively past indicia or perforation sensing means which here take the form of a plurality of feeler pins. There is one such feeler pin for each level at which significant perforation locations can occur in the two code systems previously described. Thus, there are five feeler pins P2, P3, P4, P5, and P7 which are spaced to be alined with the levels 2, 3, 4, 5 and 7 (FIGS. 2 and 4) of any line of perforations. The checks are each provided with a row of feed holes 50 (FIG. 1) which are adapted to be engaged by correspondingly spaced teeth 51a and 52a on cylindrical drums 51 and 52. These drums 51 and 52 are intermittently stepped through small angles so that checks engaged with the teeth thereon will be successively advanced past the feeler pins by distances which are equal to the width of one line of perforations. The documents are fed, one after another, down a transport belt 53a from a feed roller 53, and automatically alined and engaged with the teeth on the drums 51 and 52 by means such as that disclosed and claimed in the copending application of William H. Dreyer, Serial No. 78,773, now Patent Number 3,033,445, filed December 27, 1960, and assigned to the assignee of the present application.

Without describing the apparatus of FIG. 7 in great detail, it is sufficient to observe that it includes a continuously running drive motor 55 connected by a belt 56 to a pulley 58 rigid with a sleeve 59. The sleeve 59 is connected by a slippable frictional coupling (not shown) to a sleeve 60 rigid with a shaft 61 carrying a cam 62. Normally a projection 62a on the cam 62 engages the tip of a pivoted stop 64 biased clockwise by a spring 65. Under these circumstances, the shaft 61 is held stationary although the pulley 58 and sleeve 59 are rotating. When a solenoid 66 is energized, it pulls the tip of the stop 64 downwardly against the bias of the spring 65, thereby freeing the cam 62 so that the shaft 61 is driven from the sleeve 59. As soon as the solenoid 66 is de-energized, the cam 62 and the shaft 61 will complete a revolution and will be halted when the projection 62a engages the tip of the stop 64.

As the shaft 61 rotates through each revolution, a cam 68 thereon first rocks a lever 69 which actuates a ratchet mechanism 70 so that the two drums 51 and 52 are angularly stepped in unison by a small increment to advance a check engaged with the teeth thereof by a distance equal to the width of one perforation line. The drums 51, 52 then dwell while the shaft 61 and cam 68 complete that revolution.

While the drums 51 and 52 are dwelling with a line of perforations in the record medium or document in registry with the feeler pins, another cam 75 on the shaft 61 rocks an operating lever 76 about a pivot rod 78, thereby raising a plate 76a which extends in overlying relation to a plurality of interposer arms 79 pivoted on the rod 78 and biased in a direction to raise their forward ends by tension springs 80.

The forward ends of the arms 79 respectively underlie the five feeler pins P2, P3, P4, P5 and P7. Normally, the plate 76a holds the forward ends of the arms 79 in a lowered position, so that there is no upward force on the feeler pins. However, whenever the operating lever 76 is momentarily permitted to rock in a clockwise direction so that the plate 76a is raised, then the springs 80 acting on the arms 79 will cause the latter to urge their respective feeler pins in an upward direction. Those ones of the pins which lie opposite perforations in the document will pass through the perforations, and thereby permit their corresponding interposer arms to raise. On the other hand, those ones of the feeler pins which do not lie opposite perforations will simply abut the document, being prevented from moving upwardly, and thus holding their corresponding interposer arms 79 in the lowered positions.

The forward ends of the arms 79 are provided with vertical latch surfaces normally engaged by the upper ends of a corresponding plurality of relays levers 77 pivoted on a rod 81. The lower ends of the relay levers 77 are respectively engaged with leaf spring members 82 which bias the upper ends of such relay levers inwardly toward blocking arms 84. The blocking arms are normally held separated by a cam 85 carried on the forward end of the operating lever 76. When the lever 76 is rocked clockwise by the cam 75, the cam 85 is raised from between the blocking members 84, and the latter can move inwardly toward one another. Those ones of the relay levers 77 which are associated with interposer arms that are raised, clear the latch surfaces on such interposer arms and pivot about the shaft 81 under the biasing influence of the leaf springs 82. On the other hand, those ones of the relay levers 80 which are associated with interposer arms 79 which are not raised (due to the fact that the associated feeler pins fail to find a perforation hole in the overlying document), are prevented from moving inwardly by engagement with the latch surfaces on the interposer arms.

Each of the leaf springs 82 carries an electrical contact, disposed opposite a mating contact on a stationary member. The blocking members 84 and the latch surfaces of the interposer arms, normally hold these contacts separated or open. When any combination of the relay levers 77 are permitted to rock about the rod 81, then the corresponding electrical contacts will be momentarily closed.

The several pairs of movable and stationary contacts constitute five normally open electrical switches S2, S3, S4, S5 and S7. These correspond respectively to the feeler pins P2, P3, P4, P5 and P7. Whenever any combination of holes at different levels within one line of perforations is sensed by upward movement of the corresponding combination of the feeler pins, then the corresponding combination of the switches will be momentarily closed.

Prior to the completion of each revolution of the shaft 61, the cam 75 returns the lever 76 to its original position, so that the cam 85 again separates the blocking members 84, which in turn restore the relay levers 77 and the leaf spring members 82 to their original conditions. Also, the plate 76a is lowered to depress all of the interposed arms 79, so that the feeler pins also drop free of the document which overlies them.

On the succeeding revolution of the shaft 61, the document will be again advanced a slight amount by the ratchet mechanism 70 to bring the next line or row of perforation holes into registry with the feeler pins, and the operation above-described will be repeated. In this manner, the feeler pins sense the presence or absence of a perforation in each significant location of each line of coded perforations, and correspondingly actuate the switches S2, S3, S4, S5 and S7.

For a purpose to be made clear below, a shaft 90 is drivingly connected to the shaft 61 through gears 91 which provide a 4:1 reduction ratio, and through an electric clutch 93 when an associated clutch coil 93a is energized to engage that clutch. The shaft 90 will make one revolution for every four revolutions of the shaft 61 or, in other words, for every four incremental feeding movements imparted by the drums 51, 52 to documents being read. Rigid with the shaft 90 is a cam 92 operatively associated with a plurality of cam switches mounted therearound. The cam 92 is so shaped and disposed relative to the stationary switches, that a first cam switch CS1 will be actuated for a considerable time interval during a first revolution of the shaft 61. Similarly, cam switches CS2 and CS3 will be actuated for considerable time intervals during second and third revolutions of the shaft 61. As the shaft 61 executes a fourth revolution, the cam 92 will first actuate a reading cam switch CSR, then actuate an unsealing cam switch CSU, and return to the home position where it actuates a home switch CSH. This cycle of actuation of the five cam switches shown in FIG. 7 will be repeated for every four succeeding revolutions of the shaft 61.

Referring now to FIG. 8, the electric circuit components associated wtih the apparatus of FIG. 7 are there shown. Consider for the moment that a latching relay LR is in the normal or unlatched condition, and its contacts LR1–LR6 are in the normal states illustrated. The apparatus and circuit components are thus placed in a condition to constitute the first reading means 38 and first decoding means 40 of FIG. 6 in an operative condition, and with the second reading means 39 and second decoding means 41 in FIG. 6 inoperative. Under these circumstances, the normally open switches S2, S3, S4, C5 and S7 are all permanently connected to one terminal of a voltage source, here conventionally represented by the symbol B+, through normally closed latching relay contacts LR2, LR3, LR4. The five switches lead to five bi-state devices here shown as relays having coils R2, R3, R4, R5 and R7 connected also to the other terminal of the voltage source, here conventionally shown as ground.

The five relays all control the actuation of groups of normally open and normally closed contacts arranged in a "whiffle tree" decoding matrix 95, as shown. This matrix has its single input line 95a connected to the B+ terminal through the normally closed latching relay contacts LR1. It has, further, fourteen output terminals which, as labeled, correspond to the characters 0–9, +, −, I and L. Whenever the relays R2–R4 and R7 are simultaneously energized in a particular combination, one and only one of these fourteen output terminals will be connected through the matrix 95 to the B+ terminal and receive a relatively high potential or output signal.

For example, if the relays R3 and R7 are both energized, a complete conduction path through the matrix from the input line 95a will be established only to the output terminal for the character "1," signifying that this numerical character has been read from a record medium. In like manner, it will be seen that if the relays R2, R3, R5 and R7 are all simultaneously actuated, then only one complete conduction path will be established through the decoding matrix 95 to the output terminal corresponding to the numerical character "3." Without describing the connections and operations of the decoding matrix 95 in greater detail, since they will be apparent from inspection, it may be noted that whenever the five relays which correspond to levels 2, 3, 4, 5 and 7 in the code chart of FIG. 5 are actuated in the various combinations there illustrated, the particular output terminal corresponding to the character so represented by the code will receive an output signal.

*Operation In Reading In-Line Code Characters.*—The operation of the exemplary dual code reader with the first reading means and decoding means rendered operative may now be summarized. Assume that a document embodying the invention, such as the check 20 of FIG. 1, is being fed through the apparatus of FIG. 7 and that one of the in-line code fields has been placed in registry with the sensing means or feeler pins P2, –P5 and P7. As those ones of feeler pins which lie opposite perforation holes are raised in the manner previously described, then corresponding ones of the five switches S2–S5 and S7 will be momentarily closed. With this, a correspondnig combination of the five relays R2–R5 and R7 (FIG. 8) will be momentarily and simultaneously actuated. Accordingly, the relay contacts within the decoding matrix 95 will be placed in a condition which will result in connection of the B+ terminal to that particular one of the several output terminals which corresponds to the numerical character represented by the row of code perforations which has been sensed.

If the row of coded perforations represents the character "5," then it will contain perforations at levels 3 and 5 (FIG. 5). Accordingly, the feeler pins P3 and P5 will be raised momentarily, and the switches S3 and S5 will be momentarily and simultaneously closed. As shown in FIG. 8, this will result in momentary and simultaneous actuation of two of the relays R3 and R5, conditioning the contacts within the decoding matrix 95 such that a circuit is completed between the B+ terminal and the output terminal which corresponds to the character "5." If the check 20 shown in FIG. 1 with the specific coded characters applied thereto is fed through the apparatus of FIG. 7, the output terminals 80316, 594, 03863, and 07 will be successively placed at high potential, constituting a "reading" of those numerical characters. The output signals which appear on the output terminals may be fed directly to business machines such as sorters, tabulators, or computers as the controlling or input signals therefor. Since this procedure is well known in the art, it will not be further detailed.

The latching relay LR (FIG. 8) and its associated contacts correspond collectively to the enabling and disabling devices 42, 44 and 48, 49 diagrammatically represented in FIG. 6. As here shown, the latching relay includes a movable armature 96 biased to the right by a compression spring 98 and associated with a latching coil 99. Momentary energization of the coil 99 shifts the armature 96 to the left, and a latching finger 100 will engage a latch member 101 to hold the armature in that position. Associated with the latching finger is an unlatching coil 102 having its armature connected to raise the latching finger 100 when that coil is energized. Thus, if the coil 102 is momentarily energized after the armature 96 has been latched, the armature 96 returns to its unlatched position under the influence of the biasing spring 98. The armature 96, as schematically shown, is physically connected to control the contacts LR1–LR6. When the armature is in its unlatched position, contacts will be in the positions illustrated. When the armature is latched, the contacts LR1–LR4 open, and the contacts LR5 and LR6 close. Such latching relays are, per se, well known in the art and may take a variety of specific structural forms.

If at any time in the reading of in-line coded characters, as described above, the reading means senses coded indicia which represents the prefix character "L," the latching coil 99, connected from the output terminal "L," to ground, will be energized. This will result in latching of the armature 96, causing the contacts LR1–LR4 to be opened, and the contacts LR5 and LR6 to be closed.

The apparatus has now been converted or conditioned so that the switches S2–S5 and S7, and the relays R2–R5 and R7 constitute the enabled second code reading means 39, and so that the same decoding matrix 95 now constitutes the second decoder 41, of FIG. 6.

Closure of the contacts LR6 energizes the clutch coil 93a (FIG. 8) so that the cam 92 will be driven through one-quarter revolution for each revolution of the shaft 61.

With the latching relay contacts LR2–4 open, the sensing switches S2–S5 and S7 are not always connected directly to the B+ terminal. They are selectively connected to that B+ terminal when the normally open contacts CS1a, CS2a, CS3a of the corresponding cam switches CS1, CS2, and CS3 (FIG. 7) are actuated. For example, if the switch S2 is actuated and closed, a circuit will be completed to energize the corresponding relay R2 only if at that time the normally open cam switch contacts CS3a are closed. And because the cam switches CS1–CS3 are successively actuated as the shaft 61 (FIG. 7) executes three successive revolutions and three successive code lines are sensed by the feeler pins, these switches constitute means for selectively rendering operative different ones of the sensing switches S2–S5 and S7 as successive lines of a plural-line code are sensed.

For the purpose of storing information sensed successively from individual lines of a plural-line code character, each of the relays R2–R5 and R7 is provided with normally open sealing contacts R2a–R5a, R7a connected to a common line 106 which leads to the B+ terminal through normally closed contacts CSUa of the unsealing cam switch CSU and the latching relay contacts LR5. These sealing contacts R2a–R5a, R7a can have no effect so long as the contacts LR5 are open; their respective relays will be energized and picked up only while their corresponding sensing switches are closed. However, with the contacts LR5 closed, then each time that one of the relays R2–R5, R7 is momentarily picked up by completion of a circuit through its corresponding sensing switch, then its sealing contacts will be closed and a holding circuit will be established through such contacts from the B+ terminal.

As shown in FIG. 8, normally open contacts CSRa of the cam switch CSR are connected in parallel with the latching relay contacts LR1. Thus, when the latter contacts are open, the input line 95a for the decoding matrix 95 is disconnected from the B+ terminal except during those time periods when the contacts CSRa are closed. In this manner, the decoding matrix 95 is rendered ineffective or inoperative, and is only momentarily made operative upon closure of the contacts CSRa when reading of stored information is to take place.

Also as shown in FIG. 8, the normally closed contacts CSHa are connected in parallel with a manual start-stop switch SS which controls the energization of the reader clutch coil 66. This assures that even if the switch SS should be opened to stop the reading apparatus while the reading of a plural-line code character is in progress, the clutch coil 66 will remain energized through the contacts CSHa until all lines of that character have been read and the cam 92 (FIG. 7) returned to that position at which the home switch CSH is actuated. This assures that each cycle of reading operation will always start with the cam 92 properly phased and so that the cam switches will be operated by the cam 92 in proper sequence as the shaft 61 executes four successive revolutions. The clutch 93, which is engaged only when the latching relay contacts LR6 are closed, serves to leave the cam 92 in the "home" position when in-line code characters are being read. This assures that the cam switches CS1, CS2 and CS3 are successively actuated during the reading of the first, second and third lines of a plural-line code character.

*Operation in reading plural-line code characters.*—The operation of the dual code reader to read characters represented by the plural-line, legible code of FIGS. 2 and 3 may now be summarized. Each legible character is made up of three vertical lines of perforations, and each such character is separated from the next by a space or a line which contains no perforations (FIG. 1). As the first line of a plural-line code character is brought into registry with the sensing pins P2–P5, P7 (FIG. 7) it is necessary to determine only whether or not a perforation exists at the fourth level of that line, since that is the only significant location in the first line (FIG. 2). If perforations exist at other levels of the first line, this is not important to the reading of a plural-line code character. It is not desirable for any of the relays R2, R3, R5, R7 to be energized in response to sensing of perforations at levels 2, 3, 5 or 7 in the first line.

This is here accomplished by the cam switch contacts CS1a (FIG. 8) which are momentarily closed during the sensing of the first line of a plural-line code character, and thus make it possible for the relay R4 to be momentarily energized only if a perforation is present at station 10 in the perforation field. If that perforation is present, then the relay R4 will be picked up and sealed in through its own contacts R4a.

As the shaft 61 (FIG. 7) executes a second revolution so that the second line of perforations in the plural-line code character are brought into registry with the feeler pins (FIG. 7), only the cam switch contacts CS2a (FIG.

8) will be closed. Thus, only the switch S3 is connected to the B+ terminal. Regardless of the levels at which perforations occur in the second line, the only relay which can possibly be energized in response to sensing of that line is the relay R3, and this will occur only if a perforation exists at level 3, i.e. station 8, in the rectangular matrix (FIG. 2). If a perforation does exist in the significant station 8, then the relay R3 will be momentarily energized and sealed in through its own contacts R3a.

As the shaft 61 (FIG. 7) executes a third revolution to bring the third line of a plural-line code character into registry with the feeler pins, the switch CS3a (FIG. 8) will be closed to connect the feeler switches S2, S5 and S7 to the B+ terminal. Thus, if the feeler pins detect the presence of perforations at levels 2, 5 or 7 in the third line of a plural-line code character, the relays R2, R5 or R7 will be energized and sealed in.

With this, all of the significant locations in a field for a plural-line code character have been sensed, and the relays R2–R5, R7 energized and sealed in to store information as to whether or not perforations exist at the significant locations 6, 8, 10, 15 and c. During the time that the relays are being selectively picked up and sealed in, the matrix 95 is disabled because its input line 95a is disconnected from the B+ terminal.

As the shaft 61 (FIG. 7) executes a fourth revolution, and thereby advances the document or check a distance equal to the spacing between two plural-line characters, the cam 92 (FIG. 7) first actuates the cam switch CSR, and then actuates the cam switch CSU. This causes initial closing of contact CSRa (FIG. 8) so that decoding matrix 95 is rendered effective, and a particular one of the several matrix output terminals momentarily receives a high potential signal, depending upon the particular combination of the five relays which are actuated, and upon the character which was represented by the plural-line code sensed. Then, the normally closed contacts CSUa open, unsealing those ones of the five relays which had previously been picked up. With this, the apparatus of FIGS. 7 and 8 is returned to its original condition and is ready to read the succeeding three lines and space which constitute the next plural-line code character.

By way of example, if the numerical character "8" is represented by a plural-line code on a document, then as the first line is read, a perforation will be sensed in the fourth level, i.e., significant location number 10 (FIGS. 2 and 3). Accordingly, the relay R4 will be picked up and sealed in. As the second line is read, a perforation will be sensed at the third level (station number 8 FIG. 2), so that the relay R3 will be picked up and sealed in. As the third line of the plural-line code is read, perforations will be sensed at levels 2 and 5 (station 6 and 15) so that relays R2 and R5 will be picked up and sealed in. The relay R7 will not be energized because no perforations exist at the seventh level of the third line. With the relays so actuated, when the reading cam switch contacts CSRa close, a circuit will be established from the B+ terminal through the decoding matrix 95 to the output terminal for the character "8," placing that latter output terminal at a high potential.

If a prefix code for the character "I" is sensed, the decoding matrix will provide an output signal on the terminal "I." This latter terminal is connected to ground through the unlatching coil 102, so that the latching relay LR will be restored to its unlatched condition, and the dual code reading apparatus conditioned for reading in-line code characters. The clutch 93 is disengaged, leaving the cam 92 in its "home" position.

When no document is disposed opposite the sensing pins P2–P5, P7, and the shaft 61 (FIG. 7) is rotating, all of the switches S2–S5, S7 will be closed. Also, when a portion of a document with no perforations at all overlies the sensing pins, none of the switches S2–S5, S7 will close as the shaft 61 rotates. This is not objectionable, however, since the decoding matrix 95 can produce no output signal when none or when all of the relays R2–R5, R7 are simultaneously actuated.

Upon comparison of FIG. 6 with FIGS. 7 and 8 it will be apparent that a number of structural components are employed in common in both the first and second reading means 38 and 39 and the first and second decoding means 40 and 41 to perform two separate functions. While this is not essential, the arrangement typified by FIGS. 7 and 8 is highly advantageous in that it requires but a single set of feeler pins P2–P5, P7 and a single set of sensing switches S2–S5, S7 controlled thereby. Moreover, it requires but a single set of relays R2–R5, R7 to control a single decoding matrix 95. This is possible because in the present instance all of the significant locations within the field of a plural in-line code character exist at different levels, and at levels which correspond to those of significant locations in an illegible, in-line code character field.

The latching or unlatching of the latching relay LR in effect converts the apparatus and circuitry of FIGS. 7 and 8 from a single-line code reader to a plural-line code reader simply by changing the conditions of the contacts LR1–LR5. When operating as a single-line code reader, the five cam switches shown in FIGS. 7 and 8 have no effect at all, but when converted to operate as a plural-line code reader, these switches make certain that only certain levels within successive lines are sensed and that information contained within the successive lines of a plural-line code are stored until all have been sensed. Thus, the apparatus of FIG. 7 embodies one arrangement for selectively reading perforated code lines one at a time or n lines at a time, n here being three. By the terminology "reading plural lines at a time," it is intended to connote both the simultaneous reading of a plurality of lines or the rapid successive reading of a plurality of lines before a composite output response thereto is generated.

We claim as our invention:

1. A record medium having characters represented thereon by indicia applied in two binary codes, the first code being a plural-line, matrix code with indicia selectively applied at different stations to make visibly legible the character represented, and the second code being a single-line code with indicia selectively applied at stations within a single line to make visibly illegible the character represented, each different character being represented by indicia located at the same horizontal levels in both said plural-line code and said single-line code.

2. A record medium having indicia thereon to present characters according to two binary position codes, the first code being a plural-line, rectangular field code with indicia selectively applied at different stations to make each character visibly legible, the second code being a single-line code with indicia selectively applied at stations within a single line to make each character visibly illegible, each group of characters in the first and second codes being respectively preceded by an identifying prefix character in the second or first code, each different character being represented by indicia located at the same horizontal levels in both said plural-line code and said single-line code.

3. A record medium for use in automated reading of business information and having characters represented thereon by indicia in two different binary position codes, the first code being a plural-line, legible code with at least one significant indicia location in each line and with each significant indicia location at a different level, and the second code being a single-line code with each significant location within a line located at the same level as a corresponding significant location in said plural-line code, the lines of indicia in both codes being parallel and successively spaced on the medium.

4. A record medium for use in automated reading of business information and having characters represented thereon by indicia in two different binary position codes, the first code being a plural-line, legible code with at least one significant indicia location in each line and with each significant indica location at a differential level, and the second code being a single-line code with each significant location within a line located at the same level as a corresponding significant location in said plural-line code, any given character in both codes being represented by indicia disposed at selected ones of said significant indicia locations in each code and at identical levels irrespective of the particular code employed, the lines of indicia in both codes being parallel and successively spaced on the medium.

References Cited by the Examiner
UNITED STATES PATENTS

| | | | |
|---|---|---|---|
| 1,957,193 | 5/1934 | Armbruster | 235—61.9 |
| 1,976,352 | 10/1934 | Maul | 178—92 |
| 2,487,357 | 11/1949 | Mills et al. | 235—61.9 |
| 2,784,392 | 3/1957 | Chaimowicz | 340—146.3 |
| 2,858,073 | 10/1958 | Taube | 235—61.12 |

MAYNARD R. WILBUR, *Primary Examiner.*

MALCOLM A. MORRISON, *Examiner.*

M. A. LERNER, R. COUNCIL, *Assistant Examiners.*